(12) United States Patent
Leiteritz (10) Patent No.: US 8,450,647 B2
(45) Date of Patent: May 28, 2013

(54) DRIVE ROLL FOR A WIRE FEEDER

(75) Inventor: Nathan Leiteritz, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1416 days.

(21) Appl. No.: 12/119,113

(22) Filed: May 12, 2008

(65) Prior Publication Data

US 2009/0277890 A1   Nov. 12, 2009

(51) Int. Cl.
  *B23K 9/12*   (2006.01)
  *B23B 3/00*   (2006.01)

(52) U.S. Cl.
  USPC .......... 219/137.7; 226/187; 226/186; 226/181

(58) Field of Classification Search
  USPC ....... 219/137.7; 226/177, 181–184, 188–190, 226/193
  See application file for complete search history.

(56) References Cited

U.S. PATENT DOCUMENTS

| | | |
|---|---|---|
| 2,181,082 A | 11/1939 | Hammon |
| 2,925,170 A | 2/1960 | Rath et al. |
| 3,391,844 A | 7/1968 | Bell et al. |
| 3,576,966 A | 5/1971 | Sullivan |
| 3,744,694 A | 7/1973 | Karnes et al. |
| 3,748,435 A | 7/1973 | Reynolds |
| 4,068,106 A * | 1/1978 | Shaputis ............... 219/137.2 |
| 5,816,466 A | 10/1998 | Seufer |
| 2005/0224486 A1 | 10/2005 | Matiash |

OTHER PUBLICATIONS

Miller Electric Parts Catalogue, pp. 46-49.

* cited by examiner

*Primary Examiner* — Brian Jennison
(74) *Attorney, Agent, or Firm* — Quarles & Brady LLP (57) ABSTRACT

A drive roll is disclosed that is useable in a wire feeder for advancing a wire. The drive roll includes a first side, a second side offset from the first side, and an annular surface between the first side and the second side. An annular groove is formed in the annular surface and defines an engagement surface. Pluralities of lands are spaced along the engagement surface and pluralities of notches are formed in the engagement surface for engaging and advancing the wire. An engagement ratio is defined between the total land area of the plurality of lands and the total notch area of the plurality of notches calculated at the engagement surface. The engagement ratio defines a drive roll that accurately engages and advances the wire over a longer period of use.

12 Claims, 5 Drawing Sheets

DRIVE ROLL FOR A WIRE FEEDER

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to drive rolls for use in welding-type wire feeders and, more particularly, to a drive roll with an improved engagement configuration.

Certain welding techniques, such as gas metal arc welding ("GMAW") incorporate a consumable wire electrode. During the welding process, a metal wire is fed through a welding-type gun where the wire ultimately conducts electrical current and serves as a filler metal forming the weld.

A mechanism, commonly known as a wire feeder, is used to advance the wire from a spool to the welding-type gun during the welding process. The wire feeder typically includes two opposing drive rolls. Each drive roll is rotatably mounted such that the wire is fed between the periphery of each complementary rotating drive roll at a pinch zone. The clamping force applied by the drive rolls at the pinch zone may be adjusted; however, a minimum clamping force is required to accurately and reliably advance the wire during operation.

The ultimate force available to advance the wire is generated by a combination of clamping force and the surface contour of the drive roll. One common surface contour consists of a fully-formed, fine pitch knurled surface having a plurality of teeth for engaging the wire (shown in related art FIG. 9). The drive roll teeth engage and compress the wire as the wire is driven through the pinch zone toward the welding-type gun.

The cyclical engagement between the teeth, exacerbated by the stresses imparted by the clamping force, result in drive roll wear. As the drive roll wears, the accuracy of the wire advancement is diminished and can ultimately lead to weak, poor-quality welds or bird-nesting (i.e., the wire becomes tangled in the drive rolls and related mechanisms).

Several techniques have been suggested to increase the useful life of the drive rolls, albeit with limited success. One approach involves selecting a stronger drive roll material and/or performing a surface hardening or other heat treatment of the drive roll to improve its resistance to deformation and wear. While this technique may increase the useful life of a drive roll, the teeth continue to wear and the additional manufacturing operations are costly.

Another approach includes eliminating the teeth found on the drive roll; however, to compensate for the lack of teeth to engage and drive the wire, the clamping force between the drive rolls is increased. This increased force results in greater wear on other components of the wire feeder, such as the drive roller bearings. Additionally, as with the fully knurled design, excessive deformation of the filler wire can result in poor quality welds.

The most prevalent approach implemented to reduce the impact of drive roll wear is to simply include a pair of spaced-apart, fully-formed, knurled grooves on a single drive roll. Thus, when the teeth of the first groove wear out the drive roll is flipped so that the unused teeth of the second groove engage the wire. Once the teeth in the second groove have worn, the entire drive roll is discarded and replaced with a new drive roll.

As a result of the established challenges, the drive roll is seen as a readily consumable part of a wire feeder. Therefore, it would be desirable to have a drive roll capable of providing accurate advancement of the wire over a greater number of cycles, minimizing the stresses imparted to the wire feeder components, maintaining the functionality of the engagement surface, and remaining economical and easy to manufacture.

BRIEF SUMMARY OF THE INVENTION

The present invention overcomes the aforementioned challenges by providing a drive roll having an engagement ratio that accurately engages and advances the wire over a longer period of use, while imposing minimal wear on the components of the wire feeder. Furthermore, the engagement ratio allows the drive roll to better absorb the cyclical stresses, to maintain an advancement edge, and to minimize the deformation of the filler wire as it is driven between adjacent drive rolls.

In accordance with one aspect of the present invention, a drive roll useable in a wire feeder for advancing a wire is disclosed that includes a first side, a second side offset from the first side, and an annular surface between the first side and the second side. An annular groove is formed in the annular surface and defines an engagement surface. Pluralities of lands are spaced along the engagement surface and pluralities of notches are formed in the engagement surface for engaging and advancing the wire. An engagement ratio is defined by the total land area of the plurality of lands calculated at the engagement surface divided by a total notch area of the plurality of notches calculated at the engagement surface. The engagement ratio is greater than zero.

In accordance with another aspect of the present invention, a drive roll useable in a wire feeder for advancing a wire is disclosed that includes a first side, a second side offset from the first side, and an annular surface between the first side and the second side. An annular groove is formed in the annular surface and defines an engagement surface. Pluralities of lands are spaced along the engagement surface and pluralities of notches are formed in the engagement surface for engaging and advancing the wire. An engagement ratio is defined by a total notch area of the plurality of notches calculated at the engagement surface divided by a total land area of the plurality of lands calculated at the engagement surface. The engagement ratio is less than or equal to one.

In accordance with yet another aspect of the present invention, a method of forming a drive roll useable in a wire feeder includes the steps of providing a blank having a first side offset from a second side and an annular surface between the first side and the second side, providing a knurling tool, and partially engaging the knurling tool with the annular surface to deform the annular surface to form a plurality of lands and a plurality of notches spaced between the lands. The total number of lands formed is less than thirty per inch of the annular surface.

Various other aspects and features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

The present invention is described in relation to a gas metal arc welding ("GMAW") system including a wire feeder having opposing drive rolls. However, the many aspects of the present invention are equally applicable to various other types of systems that require some form of drive roll to manipulate a driven object, such as a pipe roller. Moreover, numerous configurations of single or multiple drive rolls are contemplated by the present invention. For example, while a pair of opposing drive rolls are described, two pairs of opposing drive rolls may be configured or a three-to-two configuration may be used where the weight of the driven object requires additional support (i.e., three drive rolls beneath the object and two above). Furthermore, multiple drive rolls may be used where the driven object is highly sensitive to surface pressure, as the use of multiple drive rolls in accordance with the present invention will help disperse the overall forces applied to the object.

Figure 1:
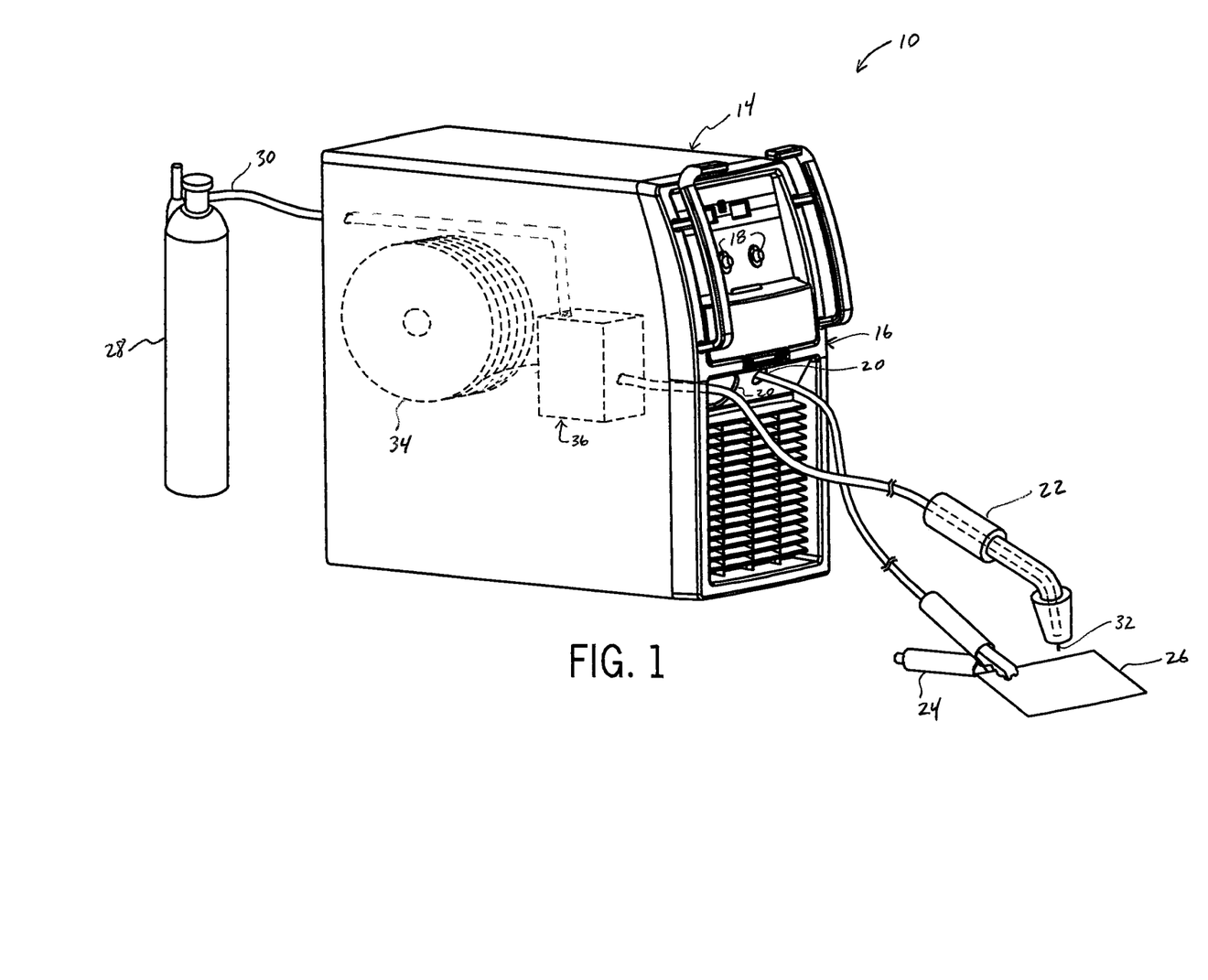
FIG. 1 is an isometric view of a welding system incorporating the present invention.

A welding system 10 incorporating a drive roll 12 of the present invention is generally shown in FIG. 1. The welding system 10 is preferably suitable for GMAW, however as noted above, the present invention has various other applications. The welding system 10 includes a control unit 14 that encloses a power supply (not shown), or the power supply can be a stand-alone unit, that is configured to condition line power to perform the desired welding process. A front panel 16 includes control knobs 18 and hookups 20 facilitating the connection of a welding-type gun 22 and a ground clamp 24 to the control unit 14. The ground clamp 24 is connected to a workpiece 26 to complete the required welding circuit. A gas cylinder 28 provides shielding gas to the control unit 14 via hose 30. The control unit 14 in turn provides the shielding gas to the gun 22 as is known by those skilled in the art. The control unit 14 may additionally enclose a cooling system (not shown) designed to regulate the temperature of the gun 22 and internal components of the control unit 14 by circulating a coolant within the gun 22 and control unit 14.

GMAW uses a consumable filler wire 32 that is typically stored on a wire spool 34 either within the control unit 14 or proximate thereto. The filler wire 32 is driven from the wire spool 34 by a wire feeder 36. The wire feeder 36 engages the filler wire 32 and drives it toward the gun 22 where it completes the welding circuit proximate the workpiece 26 and is consumed during the welding process. The control unit 14 engages the wire feeder 36 to ensure the appropriate amount of filler wire 32 is delivered to the gun 22 during the welding process. The wire feeder 36 must accurately advance the filler wire 32 while substantially maintaining the geometric integrity of the driven filler wire 32.

Figure 2:
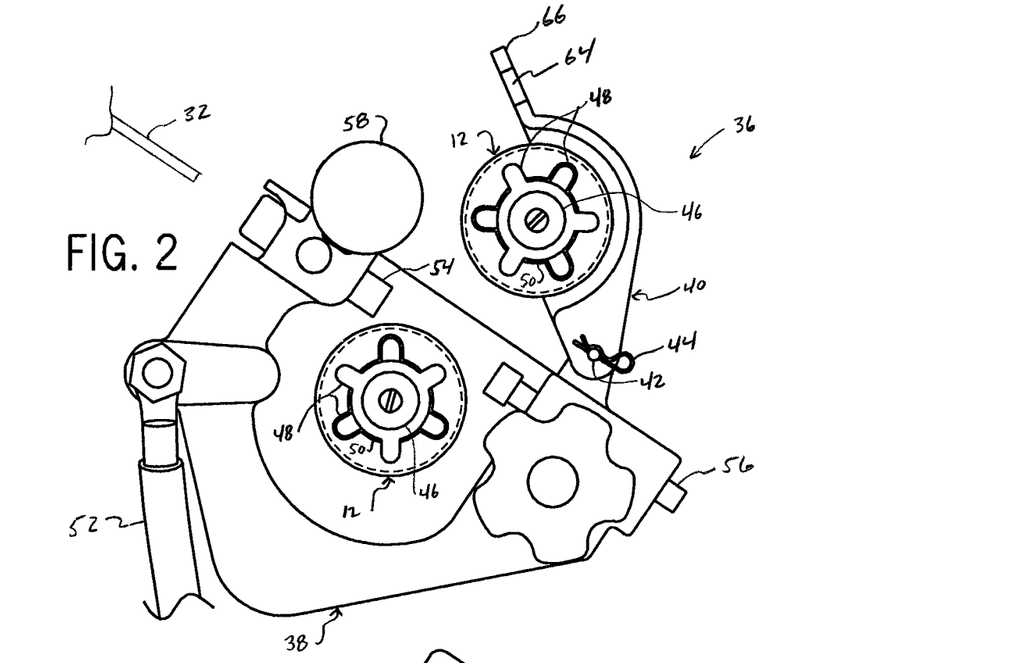
FIG. 2 is a side elevation view of a wire feeder in the load position incorporating the present invention.
Figure 3:
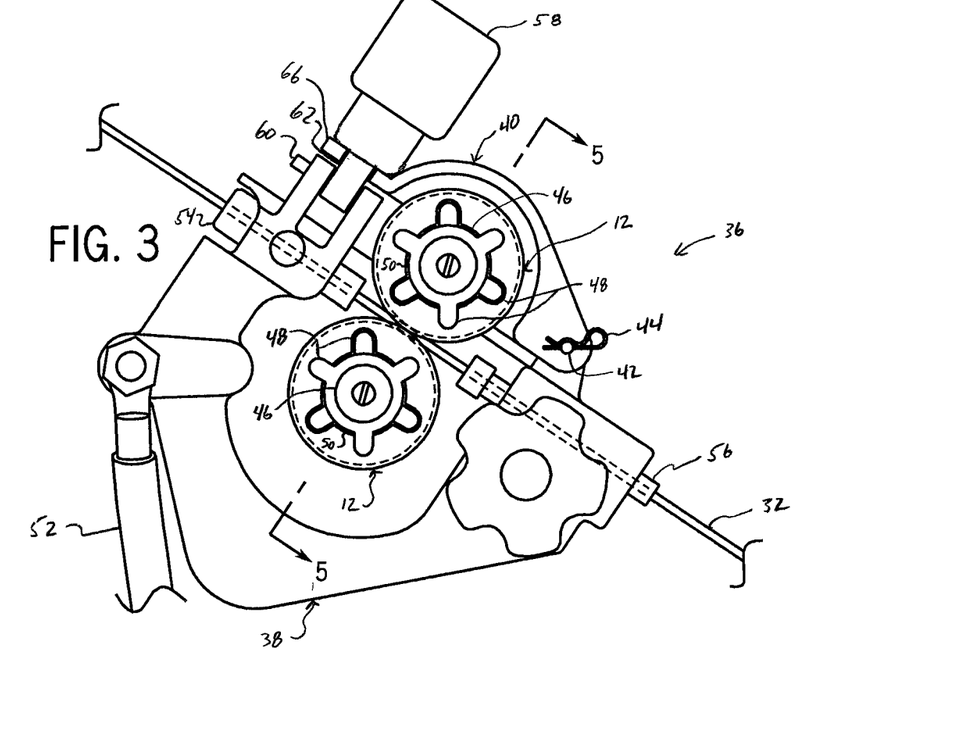
FIG. 3 is a side elevation view of the wire feeder of FIG. 2 in the engaged position.

With additional reference to FIGS. 2 and 3, the configuration of an examplary wire feeder 36 of the example embodiment is described in greater detail. The wire feeder 36 generally includes a lower drive roll assembly 38 and an upper drive roll assembly 40. The upper drive roll assembly 40 is pivotally coupled to the lower drive roll assembly 38 via a pivot pin 42 axially restrained by a cotter pin 44, and pivots between the open position shown in FIG. 2, at which the filler wire 32 may be fed into the wire feeder 36, and the engaged position shown in FIG. 3, at which the drive rolls 12 engage the filler wire 32 proximate multiple pinch zones P (best shown in FIGS. 5 and 6) to selectively drive the filler wire 32 toward the gun 22.

The drive rolls 12 are preferably coupled to the lower drive roll assembly 38 and the upper drive roll assembly 40 by respective drive spindles 46. A series of lobes 48 radially extend from the drive spindles 46 and intermesh with mating central openings 50 formed in the drive rolls 12. The lobes 48 provide rotational force that can be used to drive one or both drive rolls 12 depending on the application requirements. The drive rolls 12 are axial restrained to the drive spindles 46 by any configuration known to those in the art. A drive motor (not shown) in connection with the control unit 14 determines the appropriate filler wire 32 advancement, and thus, drive roll 12 actuation. A power cable 52 is secured to the lower drive roll assembly 38 and is controlled by the control unit 14 to provide the required welding power. One skilled in the art will appreciate the variety of configurations available to selectively capture the drive rolls 12 to the wire feeder 36.

With the wire feeder 36 in the opened position shown in FIG. 2, the filler wire 32 feeds through an upper wire guide 54, passes substantially tangential to a the drive roll 12 coupled to the lower drive roll assembly 38, continues through a lower wire guide 56, and ultimately engages the welding-type gun 22. The upper drive roll assembly 40 is then pivoted into the position shown in FIG. 3. The lock handle 58 is pivoted about the handle pin 60 such that a post 62 of the lock handle 58 engages the notch 64 formed in the upper drive roll assembly 40. The lock handle 58 is then rotated to draw the upper drive roll assembly 40 toward the lower drive roll assembly 38 by bearing against a tab 66 adjacent the notch 64. As a result, the drive rolls 12 engage the filler wire 32 proximate the pinch zones P, best shown in FIGS. 5 and 6.

The amount of clamping force generated by the lock handle 58 must be sufficient such that the drive rolls 12 engage and consistently advance the filler wire 32; however, a force sufficient to substantially deform the typically round filler wire 32 impacts the uniformity of the ultimate weld and disturbs any protective surface coating applied to the filler wire 32 intended to aid welding. Furthermore, with related art drive rolls 100 (shown in FIG. 9), the clamping force provided by the lock handle 58 required routine adjustments to compensate for prolific wearing of the drive roll teeth. The configurations of the drive rolls 12 of the present invention better distribute the clamping force and maintain the desired engagement longer than traditional drive rolls. As such, the drive rolls 12 of the present invention significantly reduce the frequency of which the clamping force must be adjusted to maintain the desired level of filler wire 32 control, while reducing the deformation of the filler wire 32 and reducing the wear and tear imparted to the wire feeder 36 due to the clamping force.

With additional reference to FIGS. 4-7, the structure and engagement of the drive rolls 12 are described in more detail. The drive roll 12 includes a first side 68 offset substantially parallel from a second side 70. An annular surface 72 extends between the first side 68 and the second side 70 and, in the example embodiment, includes a pair of annular grooves 74 formed therein. As noted above, each drive roll 12 may include a single or multiple annular grooves 74, depending on the application requirements and the desire to "flip" the drive roll 12 to alter the groove 74 used to drive the filler wire 32. Moreover, the first side 68 and second side 70 need not be substantially parallel, but may be skewed with respect to the other.

Figure 5:
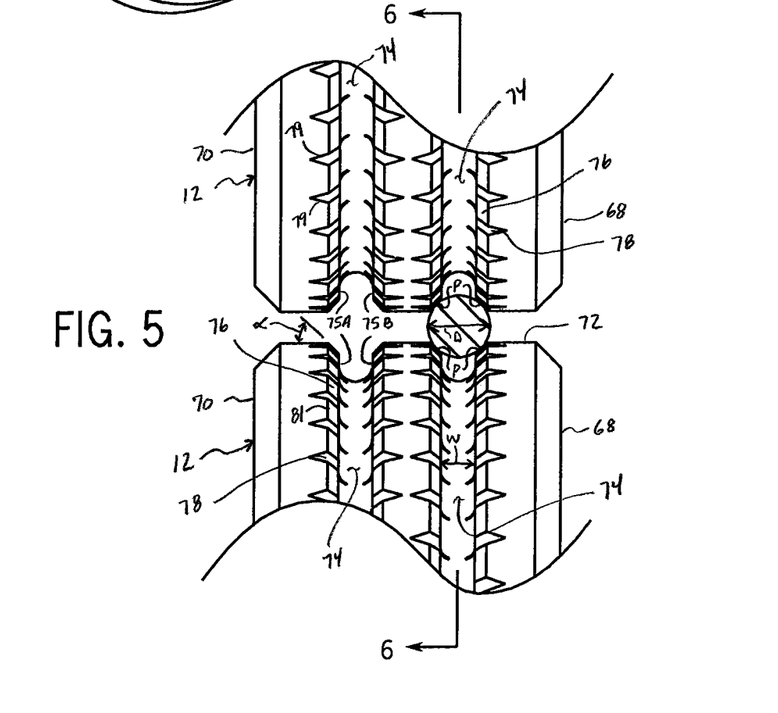
FIG. 5 is a partial end elevation view of a pair of drive rolls in accordance with the present invention.
Figure 6:
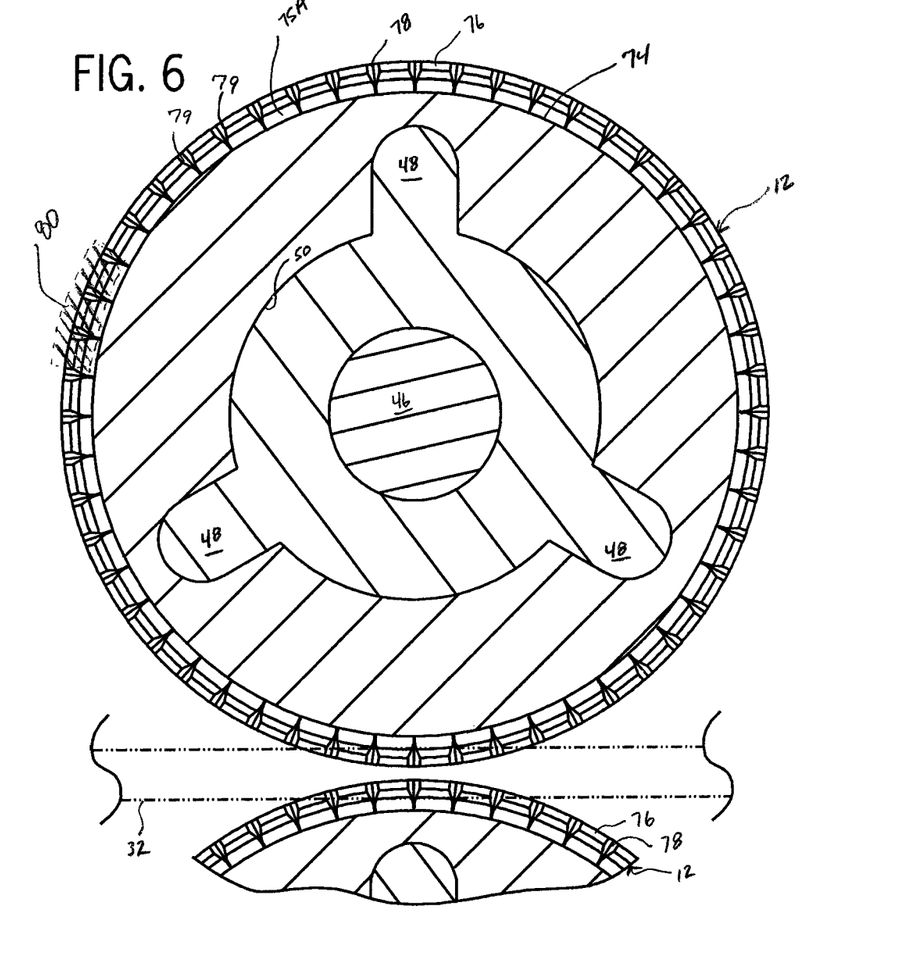
FIG. 6 is a partial section view along line 6-6 of FIG. 5.

With reference to the annular grooves 74, only one of which will be described in detail with the understanding that the others are substantially identical, the annular groove 74 includes a plurality of lands 76 and notches 78 formed proximate the substantially vertical sides 75A, 75B of the annular groove 74, preferably continuously about the drive roll 12. The lands 76 and notches 78 are configured to engage and drive the filler wire 32, as shown in FIGS. 5 and 6. The notches 78 further define a plurality of edges 79 that initially engage the filler wire 32 and help drive the filler wire 32 as desired. The edges 79 are preferably substantially linear segments, however, the edges 79 may define a variety of configurations (e.g., stepped, saw toothed, etc.) as viewed generally from the FIG. 7 vantage. The lands 76 generally define a semi-imaginary arcuate engagement surface 80 that is continuously parallel with the lands 76 and maintains the contour of the lands as it passes over the notches 78 (partially shown in FIG. 6). The annular grooves 74 preferably include two sets of alternating lands 76 and notches 78 that are mirrored across the annular groove 74 as shown in FIG. 5; however, the lands 76 and notches 78 that are across the annular groove 74 may be effectively offset such that a notch 78 on one side 75A of the annular groove 74 is across from a land 76 formed in the opposite side 75B of the annular groove. Obviously, many variations of the relative land 76 to notch 78 orientation are available and within the scope of the present invention.

The annular groove 74 may include a chamfer 81, as shown in FIG. 5, such that the engagement surface 80 intersects the annular surface 72 at an angle α. The angle α may be altered depending on the diameter D of the filler wire 32 in combination with the width W of the annular groove 74. One skilled in the art will appreciate the various angles α and widths W that are appropriate for use with differing filler wires 32.

Figures 7, 9:
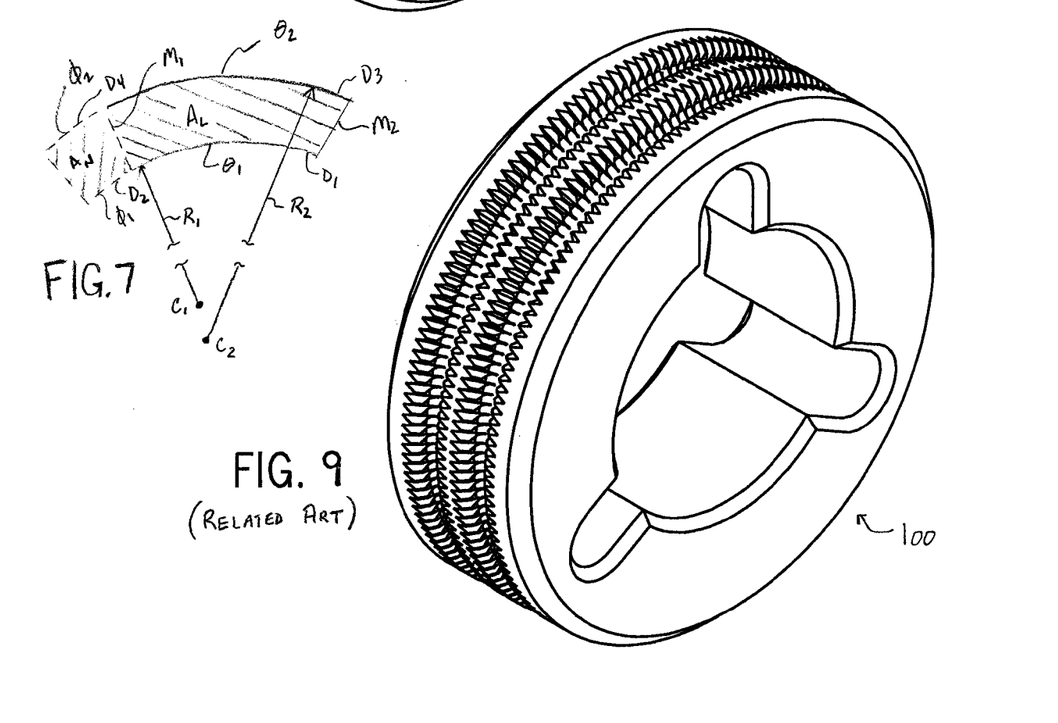
FIG. 7 is a detailed view showing an engagement ratio of the drive roll of FIG. 6.
FIG. 9 is an isometric view of a related art drive roll not benefiting from the present invention.

The approximate area defined by an individual land 76 and notch 78 with respect to the engagement surface 80 may be calculated in a variety of ways. Given the curvature of the drive roll 12, and thus the arcuate nature of the lands 76 and notches 78, a determination of the exact area requires rather complex surface integration. However, for purposes of explanation, the land area $A_L$ and the notch area $A_N$ can be reasonably approximated by generally calculating the respective land area $A_L$ and the notch area $A_N$ under the assumption that each individual land 76 and notch 78 is substantially planar as viewed generally normal to the engagement surface 80. This planar assumption is generally depicted in FIG. 7, with the curvature exaggerated for clarity.

Given the above assumptions, the approximate land area $A_L$ is calculated by the following formula:

$$\text{Land Area}(A_L) \approx \left(\frac{\pi}{360}R_2^2\theta_2\right) - \left(\frac{\pi}{360}R_1^2\theta_1\right)$$

Again, given the above assumptions, the approximate notch area $A_N$ is calculated by the following formula:

$$\text{Notch Area}(A_N) \approx \left(\frac{\pi}{360}R_2^2\phi_2\right) - \left(\frac{\pi}{360}R_1^2\phi_1\right)$$

Figure 4:
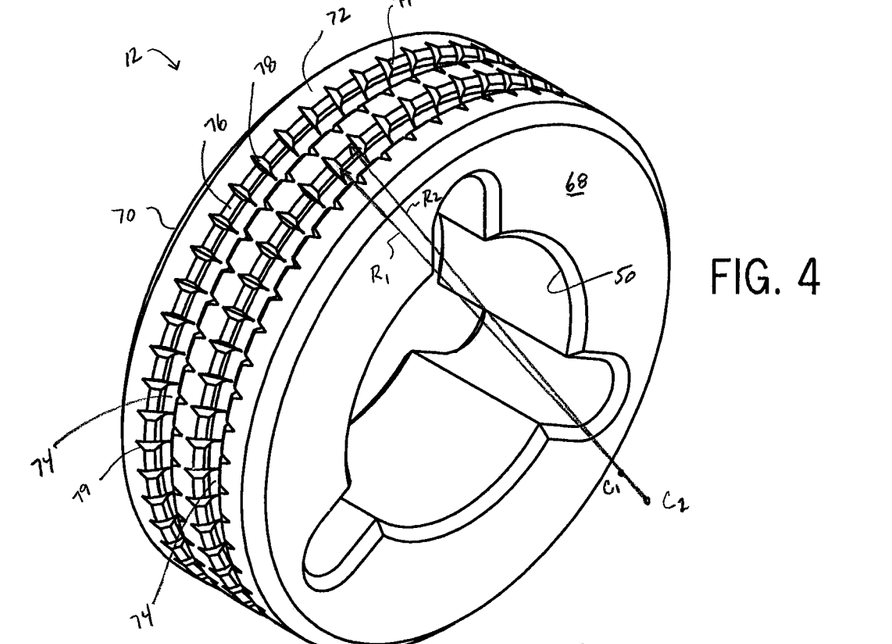
FIG. 4 is an isometric view of a drive roll incorporating the present invention.

In the above formulas, $\theta_1$, $\phi_1$, $\theta_2$, and $\phi_2$ represent the respective angles swept along respective arc lengths $D_1$, $D_2$, $D_3$, and $D_4$, as shown best in FIG. 7, with $\theta_1$ and $\theta_2$ preferably generally equal and $\phi_1$ and $\phi_2$ preferably generally equal. Unlike the substantially normal relationship depicted in FIG. 7, varying the arc lengths $D_1$, $D_2$, $D_3$, and $D_4$ may result in connecting lengths $M_1$ and $M_2$ that are not substantially normal to the respective arc lengths $D_2$, $D_4$ and arc lengths $D_1$, $D_3$, thus altering the geometry of the lands 76 and notches 78. One skilled in the art will appreciate the numerous relative arrangements of the various lengths. Furthermore, $R_1$ and $R_2$ represent the approximate radius of curvature of the lands 76 and notches 78 from points $C_1$ and $C_2$, respectively, as best shown in FIG. 4. Points $C_1$ and $C_2$ need not be the same; however, $R_1$ and $R_2$ are preferably defined from the same point in space such that points $C_1$ and $C_2$ substantially coincide. As one skilled in the art will appreciate, a variety of techniques are available to calculate, either exactly or approximately, the respective total land area $A_L$ and total notch area $A_N$ for various configurations. For example, the lands 76 and notches 78 may be approximated as rectangular at the engagement surface 80 or calculated with the use of surface or solid modeling software.

Provided the total land area $A_L$ and total notch area $A_N$ are calculated consistently, the ratio between the land area $A_L$ and notch area $A_N$, whether on a one-to-one basis or in aggregate, generally establishes the Engagement Ratio. The Engagement Ratio is defined as the ratio between the land area $A_L$ and the notch area $A_N$, and can be defined either as a ratio of the land area $A_L$ to the notch area $A_N$ or as a ratio of the notch area $A_N$ to the land area $A_L$.

Where the Engagement Ratio is the total land area $A_L$ divided by the total notch area $A_N$, the ratio preferably results in an Engagement Ratio greater than zero. Thus, the Engagement Ratio, in simplified form, equates to:

$$\text{Engagement Ratio} = \frac{A_L}{A_N} \approx \frac{R_2^2\theta_2 - R_1^2\theta_1}{R_2^2\phi_2 - R_1^2\phi_1} > 0$$

This ratio requires that at least some lands 76 be present to engage the filler wire 32. The lands 76 also absorb the cyclic stresses imparted to a drive roll 12 during continuous operation and enable engagement with the filler wire 32 over more cycles than drive rolls not in accordance with the present invention by providing a land area $A_L$ and better maintaining the geometry of the edges 79.

Where the Engagement Ratio is the total notch area $A_N$ divided by the total land area $A_L$, the ratio preferably results in an Engagement Ratio less than or equal to one. Thus, the Engagement Ratio may alternatively be represented in simplified form by:

$$\text{Engagement Ratio} = \frac{A_N}{A_L} \approx \frac{R_2^2\phi_2 - R_1^2\phi_1}{R_2^2\theta_2 - R_1^2\theta_1} \leq 1$$

This ratio results in a drive roll 12 incorporating lands 76 having a land area $A_L$ greater than or equal to the notch area $A_N$. While not required, the greater land area $A_L$ improves the cyclic life of the drive rolls 12, similar to that established by the previous Engagement Ratio.

Figure 8:
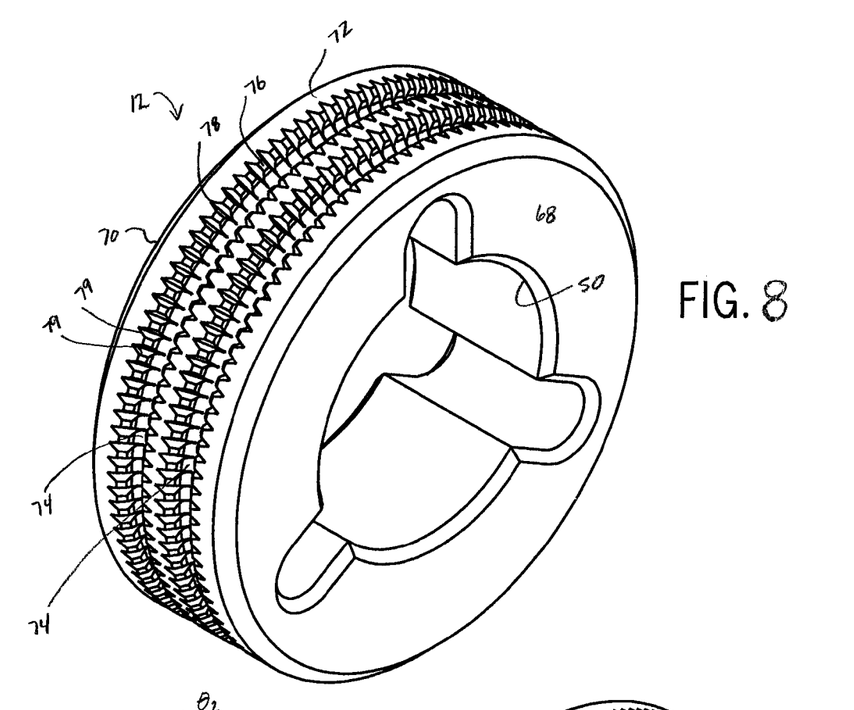
FIG. 8 is an isometric view of a drive roll in accordance with another aspect of the present invention.

A drive roll 12 incorporating a different Engagement Ratio than that illustrated in FIGS. 4-7 is shown in FIG. 8. In this aspect, the drive roll 12 includes lands 76 having a land area $A_L$ that is less than the notch area $A_N$. However, the lands 76 are within the Engagement Ratio guidelines noted above and therefore ensure that the lands 76 absorb and withstand the repeated cycling of the drive roll 12. Moreover, the Engagement Ratios described above also improve the geometric stability of the edge 79 throughout the life of a drive roll 12 by providing better impact absorption of the cyclical stresses and by providing additional land 76 material as the edge 79 wears during use.

As a result of the Engagement Ratio, the land 76 facilitates the continued efficacy of the edges 79 that initially engage and help drive the filler wire 32. The lands 76 better absorb the cyclical stresses imparted to the drive rolls 12 and, as the edges 79 wear and recede toward the adjacent land 76 (thereby reducing the land area $A_L$), provide additional material to compensate and define the edge 79; thereby increasing the useful life of the overall drive roll 12 while minimizing the concentrated stresses on the filler wire 32, drive roll 12, and the wire feeder 36 components.

A drive roll 12 in accordance with the present invention may be produced from a drive roll 12 including an annular groove 74. A knurling tool (not shown) that defines the inverse of the desired resulting land 76 and notch 78 configuration and orientation is brought into contact with the annular groove 74 where the knurling tool is partially pressed into the annular groove 74 as the drive roll 12 is rotated along the knurling tool. The land area $A_L$ and resulting notch area $A_N$ is controlled by varying the relative force with which the knurling tool is engaged with the drive roll 12. More force results in less land area $A_L$ and more notch area $A_N$, whereas less force results in more land area $A_L$ and less notch area $A_N$. This is merely one way to establish the desired drive roll 12 configuration. For example, a drive roll 12 may be provided without the annular groove 74 and the knurling tool may include a profile sufficient to create the ultimate drive roll 12 configuration. Moreover, one skilled in the art will appreciate the various other techniques (e.g., machining) that are available to manufacture a drive roll 12 having the desired Engagement Ratio.

The drive roll 12 may be produced from a variety of materials, such as 1117, 8620, and 86L20 steel, however, the drive roll 12 of the present invention is preferably made of 11 L17 steel that has been case hardened, preferably via carbonitriding and tempering to establish a surface hardness of at least approximately 58 $R_C$ (Rockwell Hardness, C-Scale) and a case depth of at least 0.015 inches. Alternatively, the drive roll 12 may be carburized or thru hardened (e.g., quenched and tempered).

The present invention has been described in terms of the various aspects, and it should be appreciated that many equivalents, alternatives, variations, and modifications, aside from those expressly stated, are possible and within the scope of the invention. Therefore, the invention should not be limited to a particular examples described.

I claim:

1. A metallic drive roll useable in a wire feeder for advancing a wire, comprising:
   a first side;
   a second side offset from the first side;
   an annular surface between the first side and the second side;
   an annular groove formed in the annular surface defining an engagement surface;
   a plurality of lands spaced along the engagement surface for engaging and advancing the wire;
   a plurality of notches formed in the engagement surface for engaging and advancing the wire; and
   an engagement ratio defined by a total land area of the plurality of lands calculated at the engagement surface divided by a total notch area of the plurality of notches calculated at the engagement surface;
   wherein the engagement ratio is greater than one tenth; and
   wherein the engagement surface intersects the annular surface at an angle.

2. The metallic drive roll of claim 1, wherein a portion of the annular groove is chamfered.

3. The metallic drive roll of claim 1, wherein the engagement ratio is approximately two and one half.

4. The metallic drive roll of claim 1, further comprising:
   a second engagement surface defined by the annular groove formed in the annular surface;
   a second plurality of lands spaced along the second engagement surface for engaging and advancing the wire;
   a second plurality of notches formed in the second engagement surface for engaging and advancing the wire; and
   a second engagement ratio defined by a second total land area of the second plurality of lands calculated at the second engagement surface divided by a second total notch area of the second plurality of notches calculated at the second engagement surface;
   wherein the second engagement ratio is greater than zero.

5. The metallic drive roll of claim 4, wherein the plurality of lands and the second plurality of lands are mirrored about the annular groove.

6. A metallic drive roll useable in a wire feeder for advancing a wire, comprising:
   a first side;
   a second side offset from the first side;
   an annular surface between the first side and the second side;
   an annular groove formed in the annular surface defining an engagement surface;
   a plurality of lands spaced along the engagement surface for engaging and advancing the wire;
   a plurality of notches formed in the engagement surface for engaging and advancing the wire; and
   an engagement ratio defined by a total notch area of the plurality of notches calculated at the engagement surface divided by a total land area of the plurality of lands calculated at the engagement surface;
   wherein the engagement ratio is less than or equal to one; and
   wherein the engagement surface intersects the annular surface at an angle.

7. The metallic drive roll of claim 6, wherein a portion of the annular groove is chamfered.

8. The metallic drive roll of claim 6, wherein the engagement ratio is approximately one half.

9. The metallic drive roll of claim 6, further comprising:
   a second engagement surface defined by the annular groove formed in the annular surface;
   a second plurality of lands spaced along the second engagement surface for engaging and advancing the wire;
   a second plurality of notches formed in the second engagement surface for engaging and advancing the wire; and
   a second engagement ratio defined by a second total notch area of the second plurality of notches calculated at the second engagement surface divided by a second total land area of the second plurality of lands calculated at the second engagement surface;

wherein the second engagement ratio is less than or equal to one.

10. The metallic drive roll of claim 9, wherein the plurality of lands and the second plurality of lands are mirrored about the annular groove.

11. A metallic drive roll useable in a wire feeder for advancing a wire, comprising:

a first side;

a second side offset from the first side;

an annular surface between the first side and the second side;

an annular groove formed in the annular surface defining an engagement surface;

a plurality of lands spaced along the engagement surface for engaging and advancing the wire, the plurality of lands defining a total land area calculated at the engagement surface; and a plurality of notches formed in the engagement surface for engaging and advancing the wire, the plurality of notches defining a total notch area calculated at the engagement surface; and wherein the total land area is equal to or greater than the total notch area; and wherein the engagement surface intersects the annular surface at an angle.

12. A method of forming a metallic drive roll useable in a wire feeder, comprising the steps of:

providing a metallic blank having a first side offset from a second side and an annular surface between the first side and the second side;

providing a knurling tool; and partially engaging the knurling tool with the annular surface to deform the annular surface to form an engagement surface having a plurality of lands and a plurality of notches spaced between the lands that intersects the annular surface at an angle;

wherein a total number of lands is less than thirty per inch of the annular surface.

* * * * *